W. L. F. MARTENS.
Centering Device for Surveyors Transits.
No. 200,836.   Patented March 5, 1878.
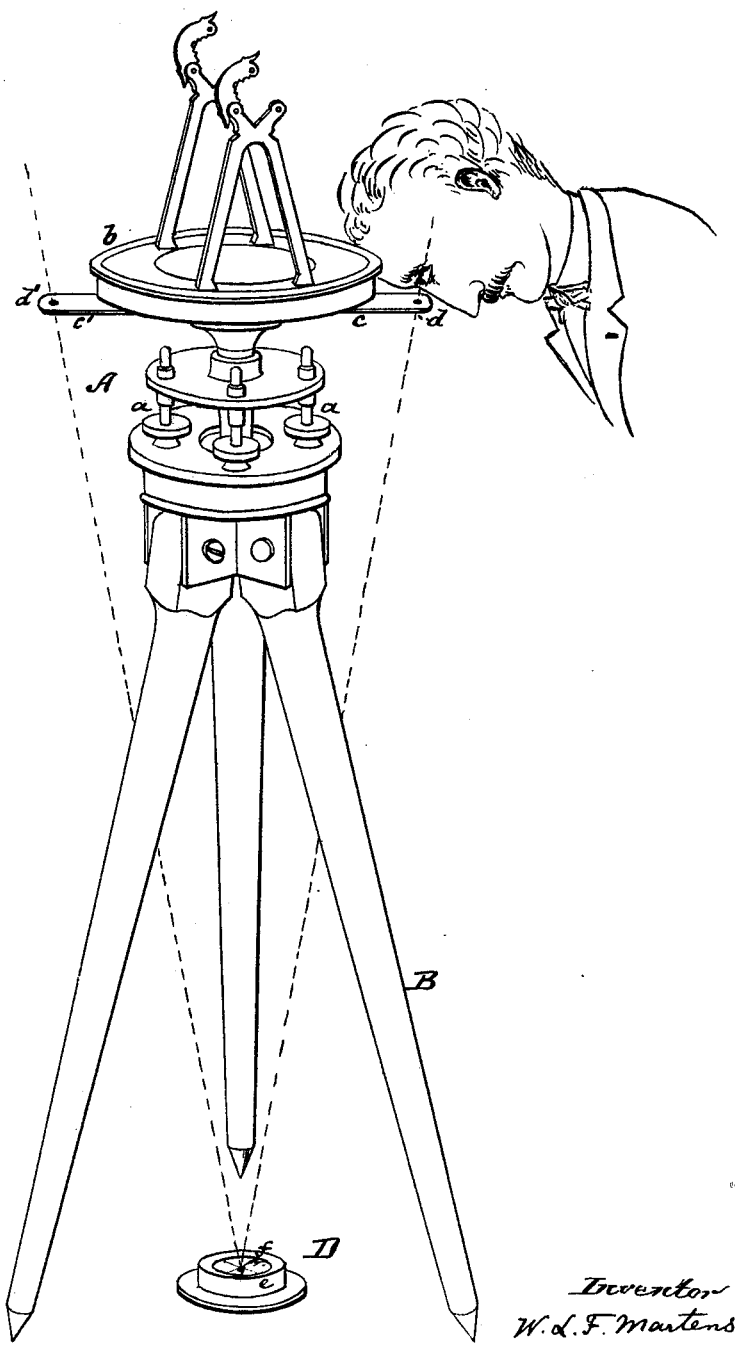

UNITED STATES PATENT OFFICE.

WILHELM L. F. MARTENS, OF COLLEGE POINT, NEW YORK.

IMPROVEMENT IN CENTERING DEVICES FOR SURVEYORS' TRANSITS.

Specification forming part of Letters Patent No. 200,836, dated March 5, 1878; application filed August 13, 1877.

*To all whom it may concern:*

Be it known that I, WILHELM LUDWIG FERDINAND MARTENS, of College Point, in the county of Queens and State of New York, have invented a new and Improved Surveyor's Instrument, of which the following is a specification:

This invention relates to an improvement on transits, theodolites, and other instruments usually used by land-surveyors for taking measurements of angles or of elevations at certain given points.

These instruments must, before the measurements are taken, be "centered" over the station-points—that is to say, placed vertically over the points at which the measurements are to be taken. In order to center such an instrument, it was heretofore usually provided with a plumb-bob, suspended by a line from the center of the instrument, such plumb-bob indicating, by its position directly over the station-point, that the instrument was properly placed in a vertical line over such point. But the use of the plumb-bob is coupled with great inconveniences, as it is apt to sway to and fro in windy weather, or when the instrument is accidentally touched, and much time is always lost before it will be at rest. So, also, must the length of the plumb-line be frequently changed if the instrument is used on uneven ground, or whenever the tripod supporting the instrument must be spread more than at other places.

Now, my invention has for its object to provide means for accurately centering a surveyor's instrument in a comparatively short time over a given point, and to avoid the objections indispensable with the use of a plumb-bob heretofore stated.

The invention consists in providing the surveyor's instrument with a "sight" and with a point or mark, which sight and mark are placed diametrically opposite each other, in a plane parallel to the limbus of the instrument, and at equal distances from its vertical axis.

The improved instrument is adapted to be used in connection with a reflector, hereinafter described, which is to be placed over the station-point over which the instrument is to be mounted, all as hereinafter more fully pointed out.

The drawing represents a perspective view of my improved surveyor's transit, the telescope having been removed; also, a perspective view of the reflector used in connection with such instrument.

The letter A represents the transit, theodolite, or other instrument that is to be centered, and which is mounted on a tripod, B, in the usual manner.

I will, in the description following, call the instrument "transit," though it is evident that the invention may be applied to various instruments of different description.

The transit A is provided with leveling screws or devices $a\ a$, in the customary manner, so that its upper graduated plate $b$ or limbus may be placed in a perfectly level position, though the tripod be not level. To this plate $b$ are attached, in suitable manner, two outwardly-projecting lugs or arms, $c\ c$, as clearly shown in the drawing, said arms being placed diametrically opposite each other, and on line with the plate $b$. The arms $c\ c'$ project a short distance outward from the periphery of the plate $b$, as shown; but, instead of using the two arms, one continuous plate may be attached to the instrument at any suitable place—say, at the Y-supports of the telescope—but in such a way as to be in a plane vertical to the axis of the instrument, and to project a short distance from both sides of the same. The arm $c$ is provided with a suitable sight, $d$, which enables the surveyor to look toward the ground, while the arm $c'$ is, at its lower side, provided with a mark, $d'$, which is exactly equidistant from the vertical axis of the instrument with the sight $d$ on the arm $c$.

D is a mirror or reflector which I use with the improved instrument hereinbefore described. This reflector is made in suitable form; but I prefer to make it in form of a circular box, $e$, provided with a reflecting-surface, $f$. At its lower side the box should be provided with a center point or mark, so that it can be placed directly over the point over which the instrument is to be centered.

The mirror or reflecting-surface $f$ has its center-point $g$ clearly marked on it, either by the crossing of two threads, as shown in the drawings, or in other suitable manner. The reflecting-surface may be produced by filling the box $e$ partly with mercury, in which case it will always seek its own level on uneven ground; or a mirror or reflecting-surface may be applied to the upper part of the box, in which case the reflector D should be provided with a spirit-level, so that it can be leveled by hand.

In order to center an instrument provided with my improvement, the reflector D is first placed over the station-point, or point over which the instrument is to be centered, so that the point $g$ on the mirror $f$ is directly over the station-point, and that the mirror or reflecting-surface itself is perfectly level. The instrument mounted on the tripod is then placed over the mirror, as nearly in vertical line therewith as can be estimated by the eye, and is then leveled. The surveyor then sights through the sight $d$ to the point $g$. If the instrument is directly over such point, he will see the image of the mark $d'$ directly on the point $g$. This is due to the fact that the mirror $f$ reflects the mark $d'$ at the same angle under which it receives the image. But as the sight $d$ is placed the same distance from the vertical axis of the instrument as is the mark $d'$, and as the sight and mark are on the same horizontal plane, (the instrument being leveled,) the image of the mark $d'$ will fall directly within the sight $d$, provided the reflecting-point (which is the point $g$) is equidistant from them, as is indicated by dotted lines in the drawing. In this way it can be readily ascertained whether or not the instrument is centered over the point $g$. If it is found that the image of the mark $d'$ is not reflected at the point $g$ of the mirror, or does not fall within the mirror at all, the position of the instrument must be changed, and the same again leveled and the point $g$ again sighted. This is continued until the image of the mark $d'$ is seen directly on the point $g$, as hereinabove described.

It will be found that by the use of this improvement an instrument can be centered in a comparatively short time and without being disturbed by the wind.

Instead of using the mark $d'$, a sight may be substituted therefor, in which case the advantage is obtained that an observation may be made from both sides of the instrument.

I claim as my invention—

1. A surveyor's instrument provided with the arms $c\ c'$, which are provided, respectively, with the sight $d$ and mark $d'$, such sight and mark being equidistant from the vertical axis of the instrument, substantially as and for the purpose specified.

2. The combination of the reflector D with the surveyor's instrument, having the perforated arm $c$ and the marked or perforated arm $c'$, substantially as specified.

WILHELM LUDWIG FERDINAND MARTENS.

Witnesses:
ERNEST C. WEBB,
F. V. BRIESEN.